(12) United States Patent
Alsaffar

(10) Patent No.: US 8,382,887 B1
(45) Date of Patent: Feb. 26, 2013

(54) SYSTEM FOR DECONTAMINATING INDUSTRIAL OUTPUT GASES

(76) Inventor: Abdulreidha A. T. A. Alsaffar, Mubarak Al Kabir (KW)

( * ) Notice: Subject to any disclaimer, the term of this patent is extended or adjusted under 35 U.S.C. 154(b) by 0 days.

(21) Appl. No.: 13/584,308

(22) Filed: Aug. 13, 2012

Related U.S. Application Data

(63) Continuation of application No. 13/232,713, filed on Sep. 14, 2011.

(51) Int. Cl.
*B01D 46/00* (2006.01)

(52) U.S. Cl. ............... 96/233; 55/289; 55/420; 55/422; 55/467; 55/482; 55/481

(58) Field of Classification Search ............ 95/210–213, 95/281; 96/228–233; 55/422, 467, 482
See application file for complete search history.

(56) References Cited

U.S. PATENT DOCUMENTS

| | | | | |
|---|---|---|---|---|
| 888,119 | A * | 5/1908 | Richards | 261/116 |
| 3,053,030 | A * | 9/1962 | Smith | 96/233 |
| 3,095,289 | A * | 6/1963 | Egan | 55/293 |
| 3,615,248 | A * | 10/1971 | Holler | 422/174 |
| 3,686,832 | A * | 8/1972 | Hori et al. | 96/125 |
| 3,754,378 | A * | 8/1973 | Christensen et al. | 95/8 |
| 3,904,376 | A * | 9/1975 | Kawata | 422/172 |
| 4,012,208 | A * | 3/1977 | Arnim et al. | 96/258 |
| 4,081,255 | A * | 3/1978 | Evans | 96/229 |
| 4,135,894 | A * | 1/1979 | Himes et al. | 95/215 |
| 4,303,420 | A * | 12/1981 | Howard | 96/230 |
| 4,512,787 | A * | 4/1985 | Mathews | 55/284 |
| 4,731,100 | A * | 3/1988 | Loeffelmann et al. | 95/281 |
| 4,859,219 | A * | 8/1989 | Huang | 96/280 |
| 5,057,129 | A * | 10/1991 | Kierzkowski et al. | 96/400 |
| 5,192,345 | A * | 3/1993 | Pala | 96/240 |
| 5,662,097 | A * | 9/1997 | Panos | 126/299 E |
| 5,756,047 | A * | 5/1998 | West et al. | 422/37 |
| 5,902,383 | A * | 5/1999 | Hirose | 96/231 |
| 6,063,164 | A * | 5/2000 | Mergy et al. | 95/212 |
| 8,163,072 | B2 * | 4/2012 | Kippel et al. | 96/233 |
| 8,231,715 | B2 * | 7/2012 | Gross et al. | 95/281 |
| 2007/0056446 | A1 * | 3/2007 | So | 96/233 |
| 2008/0105121 | A1 * | 5/2008 | Chang | 95/70 |
| 2009/0020011 | A1 * | 1/2009 | Gregg | 95/268 |
| 2009/0151565 | A1 * | 6/2009 | Tressler et al. | 95/187 |
| 2010/0263541 | A1 * | 10/2010 | Kippel et al. | 96/233 |

* cited by examiner

*Primary Examiner* — Duane Smith
*Assistant Examiner* — Thomas McKenzie
(74) *Attorney, Agent, or Firm* — Richard C. Litman

(57) ABSTRACT

The system for decontaminating industrial output gases may process both particulate and gaseous emissions from industrial facilities. The system may be located with or adjacent to an industrial facility or at some distance from the facility. In one embodiment the system includes a subsystem of alternating active and inactive filters, and a wash subsystem cleaning the inactive filters during the cycle. The wash water is captured in a basin for further processing of the chemical particulates therein. Fans located downstream of the filters draw the gaseous industrial output through the filters. Remaining vapor passes to a classification plant where the gases are separated into their constituent elements or compounds. Gases that to are allowed to escape may be burned, and the resulting gases recirculated through the system. Another embodiment is adapted for processing steam, and cools the steam for use as liquid water, rather than allowing it to escape as vapor.

8 Claims, 5 Drawing Sheets

SYSTEM FOR DECONTAMINATING INDUSTRIAL OUTPUT GASES

CROSS-REFERENCE TO RELATED APPLICATIONS

This is a continuation of my prior application Ser. No. 13/232,713, filed Sep. 14, 2011 now pending.

BACKGROUND OF THE INVENTION

1. Field of the Invention

The present invention relates generally to atmospheric emissions and pollution control systems, and particularly to a system for decontaminating industrial output gases produced by a factory or other industrial plant or the like.

2. Description of the Related Art

Factories and other industrial centers and operations typically produce various gaseous emissions as byproducts of their processes. As time has progressed it has become widely recognized that many, if not most, of these gases are harmful to the environment, and regulations have been implemented to require that such output be minimized or at least controlled.

As factories and industrial operations produce a wide variety of goods, the chemical compositions of their emissions vary widely as well. Nonetheless, it can be safely stated that the majority of such emissions comprise particulate matter mixed with other chemicals that remain in a gaseous state at ambient temperatures. Even operations that produce relatively "clean" atmospheric emissions will often produce excessive amounts of steam as a byproduct of their cooling needs. As a result, it has proven difficult to produce a system that is capable of decontaminating both particulate and gaseous output from various industrial facilities.

Thus, a system for decontaminating industrial output gases solving the aforementioned problems is desired.

SUMMARY OF THE INVENTION

The system for decontaminating industrial output gases may be constructed immediately adjacent to a factory that develops such gases, or may be located at some distance therefrom. The system comprises multiple embodiments for processing particulate matter in gaseous industrial emissions and/or vaporous emissions.

One embodiment comprises a complex of alternating active and inactive planar filter elements, a wash system for the inactive filter elements, and a collection basin for particulates washed from the filter elements. A plurality of fans draws the gases through the filter elements, and the resulting particulate-free gases are delivered by the fans to a gas classification plant for separating the remaining gaseous compounds and/or elements from one another. Another embodiment incorporates all of the above components, and includes an incinerator for burning any released gases from the classification plant. The resulting oxidized gases are recirculated through the system.

Yet another embodiment is adapted for processing the steam byproduct produced from so-called "clean" industrial processes, e.g., due to the cooling needs of nuclear power plants. As there are no particulates in such output, this embodiment deletes the filter apparatus and substitutes a cooling system for the steam output. This can be quite valuable in arid areas where the steam may be recaptured as useful water, e.g., for recirculation through the cooling system of the plant, rather than being released into the atmosphere.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The system for decontaminating industrial output gases includes several major subsystems for removing particulates from various gases and for classifying or separating the remaining gases into their separate elements or compounds, as appropriate. The system may include a subsystem for burning off remaining combustible gases and recycling the resulting products.

Figure 1:
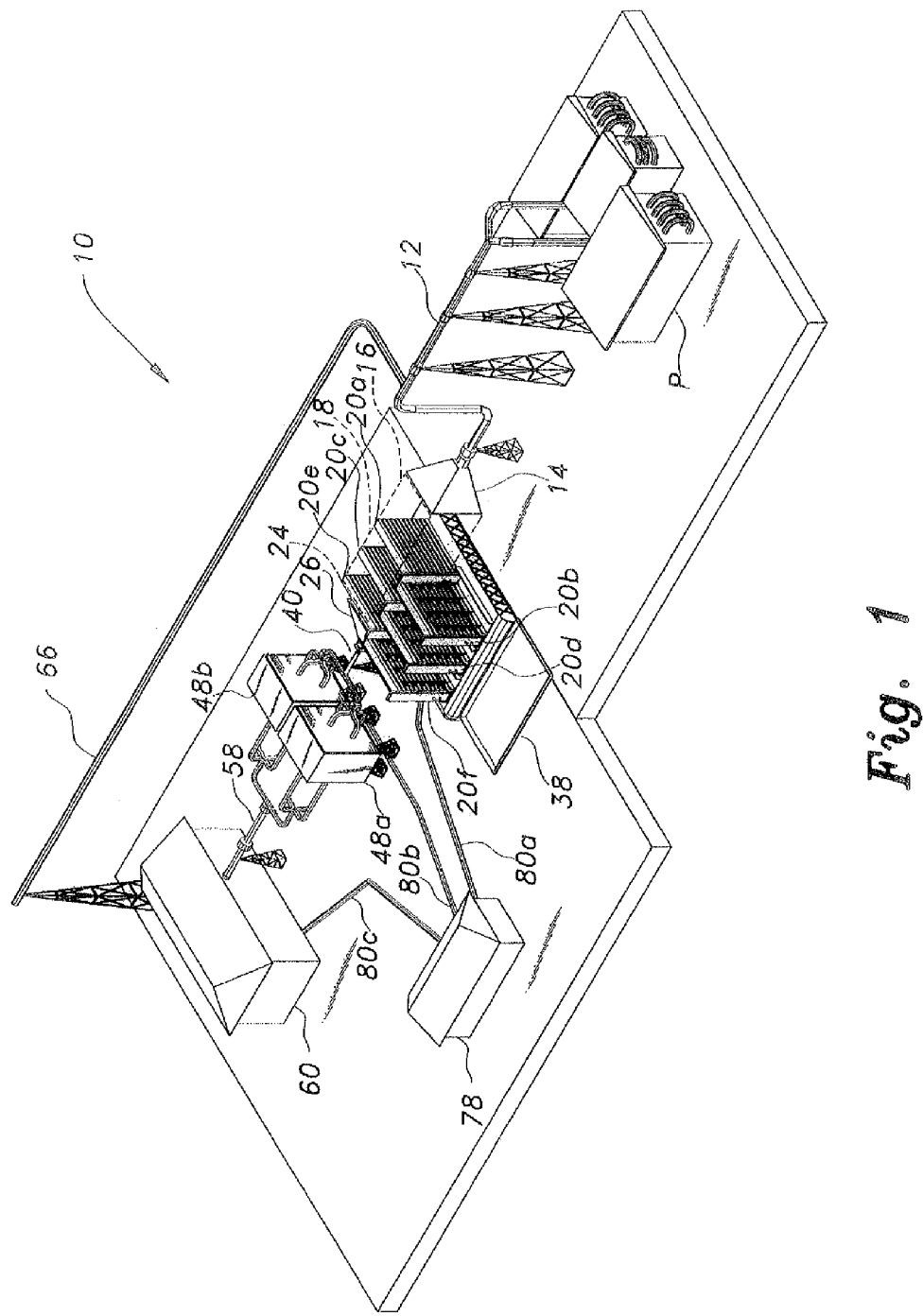
FIG. 1 is a top perspective view of a first embodiment of a system for decontaminating industrial output gases according to the present invention, illustrating its general features.

FIG. 1 of the drawings provides a general perspective view of all of the subsystems incorporated into a first embodiment of the system for decontaminating industrial output gases, generally designated as system 10. Gases produced by an industrial factory or plant P are delivered to the system 10 by a gas input flue 12 to a filter input plenum 14 at the upstream or inlet end 16 of a filter housing 18, shown in broken lines in FIG. 1 in order to show a first plurality of filters 20a, 20c, and 20e therein. Alternatively, the system 10 may be located closer to the factory or plant P, and the gas input flue 12 may be shortened accordingly, or the system 10 may be constructed immediately adjacent to the factory or plant P so that output gases pass directly to the system 10 with no intervening flue.

Figure 2:
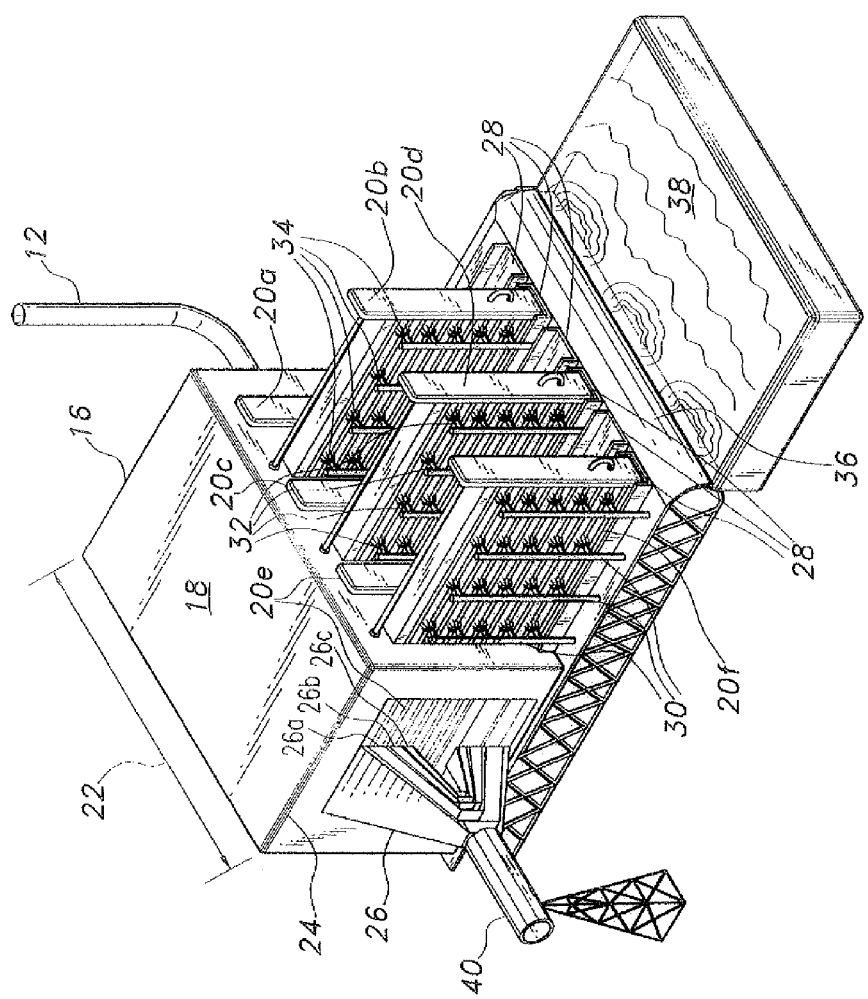
FIG. 2 is a detailed perspective view of the particulate filtration component of the system for decontaminating industrial output gases according to the present invention, showing the outlet plenum partially broken away to illustrate various details of the system.

FIG. 2 of the drawings provides a more detailed view of the filter housing 18 in its entirety, which has six generally planar filters 20a through 20f. The orientation of the filter housing 18 and associated components is turned approximately 90° counterclockwise from the orientation shown in FIG. 1. The industrial output gases flow from the gas input flue 12, through the input plenum 14 (shown in FIG. 1) and through the length 22 of the filter housing 18 from its inlet end 16 to its opposite outlet end 24 and out through the outlet plenum 26. The outlet plenum 26 may include a plurality of concentric, funnel-like guides 26a, 26b, 26c therein to reduce turbulent flow from the filter housing.

The filter housing 18 includes lateral passages or slots therein transverse to its length 22 for accepting the filters. Three of the filters are positioned within the filter housing 18 at any given time. The remaining three filters are removed from the housing 18 for cleaning. The three filters comprising each of the filter groups, i.e., the first plurality of filters 20a, 20c, 20e and the second plurality of filters 20b, 20d, 20f, are progressively arranged according to filtration capacity. The first or upstream filters 20a and 20b of each set have a coarse filtration medium, the second filters 20c and 20d have a medium filtration medium, and the final filters 20e and 20f have a fine filtration medium. It will be seen that more or fewer than three filters may be included in each group or set.

In the example illustrated in FIG. 2, a first plurality of filters 20a, 20c, and 20e are disposed laterally within the filter housing 18, i.e., with their planes transverse to the length 22 of the housing 18, and serve in an active capacity to filter particulates from the gases flowing through the filter housing 18. The remaining second plurality of filters 20b, 20d, and 20f are positioned external to the filter housing 18, where they are positioned for cleaning. The second plurality of filters 20b, 20d, and 20f are interchanged periodically with the first plurality of filters 20a, 20c, and 20e, the first plurality of filters 20a, 20c, and 20e being cleaned while the second plurality of filters 20b, 20d, and 20f is serve actively in the filter housing 18. This arrangement allows the filter subsystem to function substantially continuously. The various filters 20a through 20f translate laterally from the filter housing 18 in lateral tracks or channels 28 that extend from the side of the housing 18. The filters 20a through 20f are provided with conventional wheels or rollers or the like (not shown), which may be motorized to provide for automatic operation.

The filter cleaning system comprises a plurality of vertical standpipes 30 adjacent each of the tracks or channels 28. Each standpipe 30 includes a plurality of filter wash nozzles 32 projecting therefrom, each nozzle 32 having a rotary brush 34 extending concentrically therefrom. The nozzles 32 serve to flush particulates from the filters being cleaned, while the brushes 34 provide a physical scrubbing action on the filters. The brushes 34 are driven by a motorized chain drive system or other conventional drive means. A backsplash guard is disposed opposite each row of standpipes 30, i.e., each standpipe row is disposed between its backsplash guard and corresponding filter. A spillway 36 extends from the distal or outboard ends of the filter channels or tracks 28 to direct the expended filter wash water to an adjacent catch basin 38.

Figure 3:
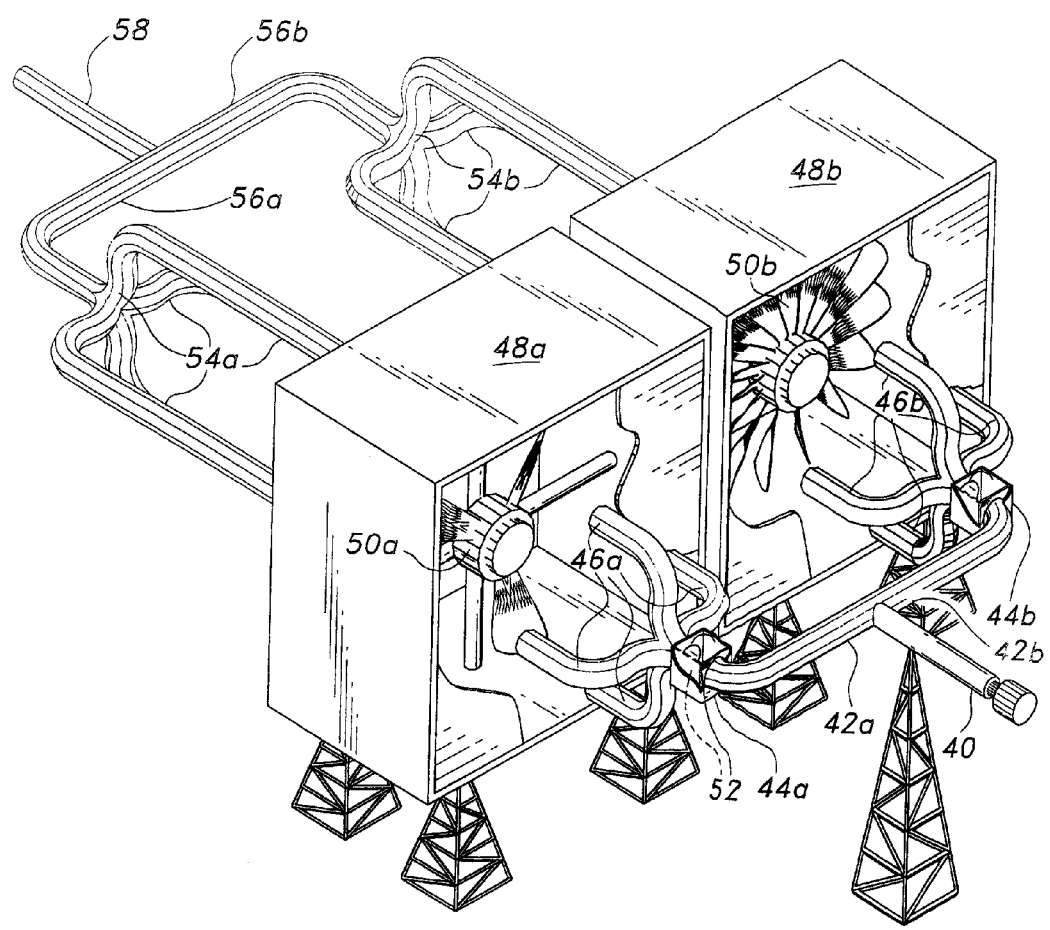
FIG. 3 is a detailed perspective view of the fan component of the system for decontaminating industrial output gases according to the present invention, showing the fan housings partially broken away to illustrate various details of the system.

Once the gases have been drawn through the filters in the filter housing 18, they are substantially free of particulate matter. The fans of the system 10 are located downstream from the filters 20a through 20f to assure that the fans are not contaminated with particulate matter carried by the gases during the operation of the fans. FIG. 3 provides a detailed illustration of the fans that draw the gases through the filter housing 18 and deliver the gases to other subsystems for further processing. After passing through the filters in the filter housing 18, the gas flows out of the housing 18 and through the outlet plenum 26 to an outlet flue 40, from which it flows to divider pipes 42a and 42b that direct the two gas streams to corresponding valve assemblies 44a and 44b. The gas flow is then further divided by a fan inlet pipes 46a and 46b extending from each valve assembly 44a, 44b. The fan inlet pipes 46a, 46b connect to corresponding fan housings 48a, 48b. The fan housings 48a, 48b are substantially completely enclosed, except for their fluid communication with the fan inlet pipes 46a, 46b and corresponding outlet pipes, described further below. However, the front panels of the enclosures or housings 48a, 48b are shown broken away in FIG. 3 to illustrate the fans 50a and 50b therein. While only a single fan is required to draw the gas through the filter housing 18, preferably two such fans 50a and 50b are provided for redundancy. Thus, the present system 10 may operate substantially continuously so that either fan 50a or 50b may be shut down when required for maintenance or repair. The fans 50a and 50b may be of two different types, as illustrated in the example of FIG. 3, or may be of identical configuration.

The gas flow control valve assemblies 44a, 44b each comprise an enclosure containing a vertically hinged flapper valve therein, e.g., the valve 52 of the left side valve assembly 44a, shown partially broken away in FIG. 3. When the right hand fan 50b is in operation, the left hand fan 50a is shut down. Along with drawing the gases from the filter outlet flue 40 through the fan 50b, the fan 50b will also tend to draw air from the left-hand fan housing 48a through the left-hand inlet pipes 46a. This reverse flow draws the flapper valve 52 closed across the end of the divider pipe 42a where it connects to the valve assembly 44a, thereby shutting off airflow from the first fan housing 48a. This position of the flapper valve 52 is shown in solid lines in the broken away valve housing 44a in FIG. 3.

Conversely, when the left side fan 50a is in operation and the right side fan 50b is idle, gas flow will be drawn through the first or left side divider 42a and through the first or left side valve assembly 44a. The direction of gas flow during this operation will push the flapper valve 52 open to allow the gas to be drawn through the first or left side fan 50a. This open valve position is shown in broken lines in the valve housing 44a of FIG. 3. It will be seen that the flapper valve within the opposite right side valve housing 44b will be positioned opposite the flapper valve in the first or left side valve housing 44a at all times during fan operation, i.e., the right side valve will be closed when the left side valve is open, and the right side valve will be open when the left side valve is closed.

After being drawn through the filter subsystem by one of the fans 50a or 50b, the gases flow into corresponding fan housing outlet pipes 54a or 54b extending from their respective fan housings 48a or 48b, either outlet pipe manifold 54a extending from the first or left side fan housing 48a or outlet pipe manifold 54b extending from the second or right side fan housing 48b, depending upon which of the two fans 50a or 50b is in operation. The gases flow through the operative manifold 54a or 54b to corresponding connector pipes 56a or 56b, which connect the two manifolds 54a, 54b to a single gas classification collector pipe or flue 58. The collector pipe 58 ducts the gases to a gas classification plant subsystem 60, shown generally in FIG. 1, where the various gases (e.g., $CO_2$, $NO_2$, gaseous hydrocarbons, ammonia, etc.) are separated or classified into their respective compounds and/or elements. This may be accomplished by known and conventional means, e.g., cryogenic separation, molecular membranes, etc. These principles are known and used commercially, and need not be expanded upon in detail here.

Figure 4:
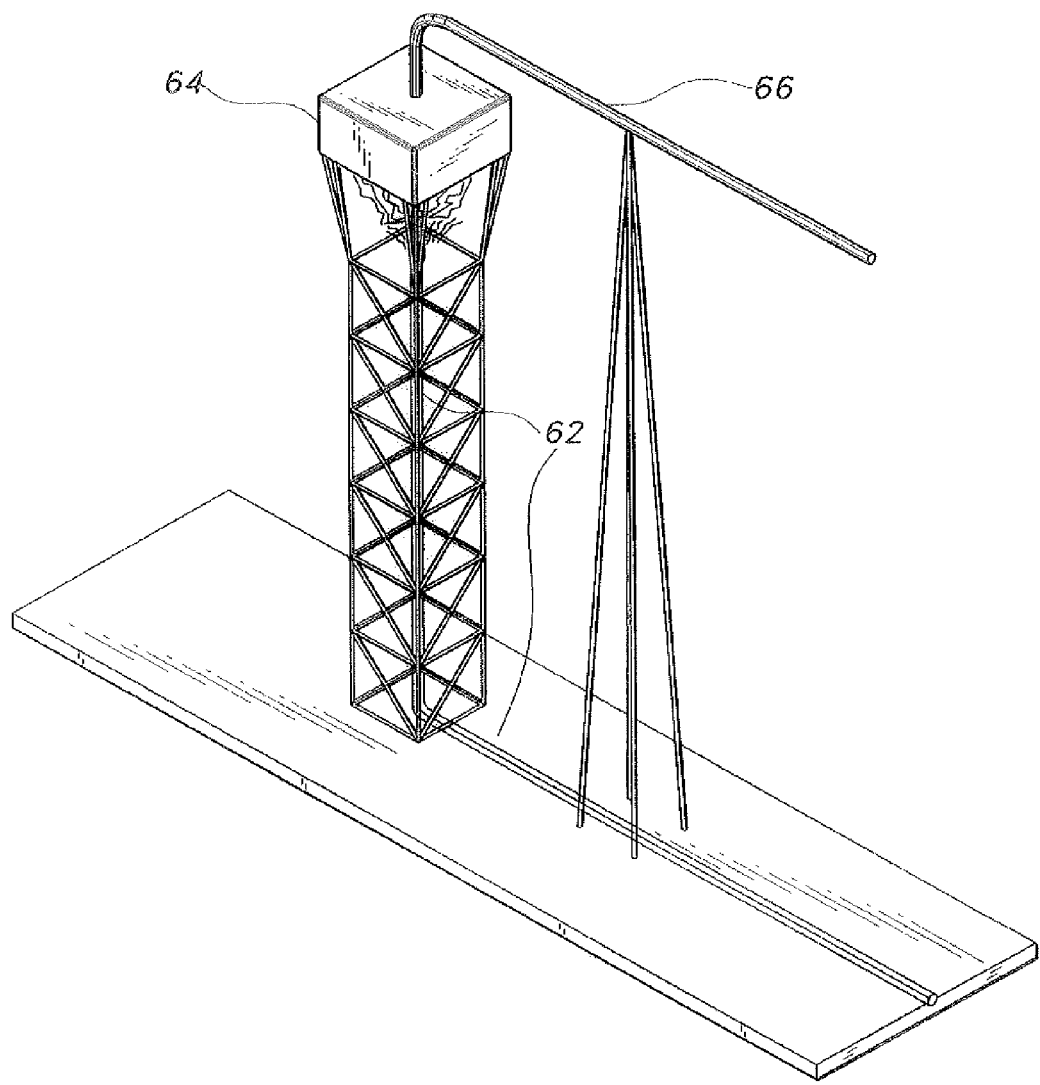
FIG. 4 is a perspective view of an alternative embodiment of a system for decontaminating industrial output gases according to the present invention, illustrating a subsystem for burning off combustible gases and recirculating the resulting gases through the system.

At this point, the gases will have been purified and separated into their constituent elements or compounds, as appropriate to the gases produced. However, some industrial factories and plants may produce certain gases that may be combusted, e.g., gaseous hydrocarbons and the like. Accordingly, the present system for decontaminating industrial output gases may include a gas burnoff and recirculation system, generally as illustrated in FIG. 4 of the drawings. A gas burnoff delivery flue or pipe 62 delivers the gases from the classification plant subsystem 60 to a burnoff site 64. The remaining gases are burned at the burnoff site 64, and any residual gases are then captured by a hood 64 and recirculated back to the gas input flue 12 (FIG. 1) by a return or recirculation flue 66 to be drawn back through the filter subsystem by the fan subsystem for further processing.

Figure 5:
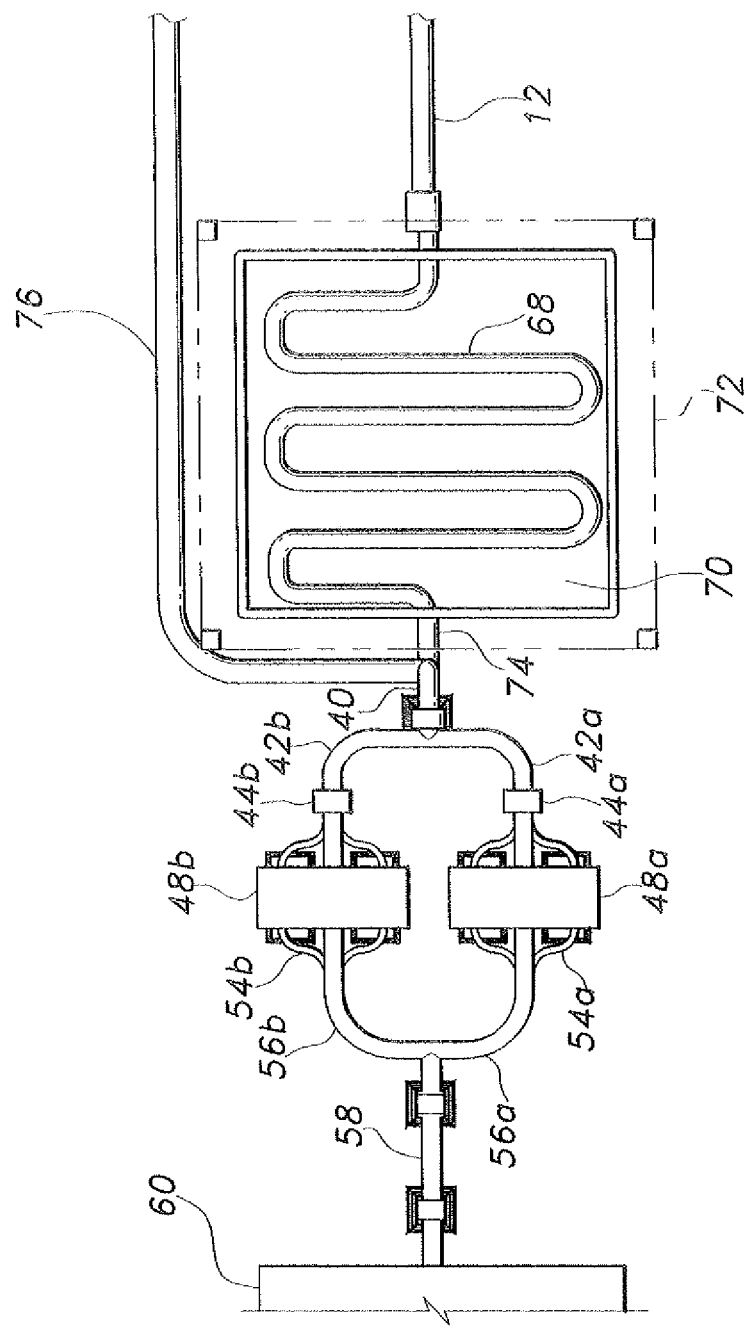
FIG. 5 is a top plan view of another alternative embodiment of a system for decontaminating industrial output gases according to the present invention, illustrating a cooling system for industrial steam output.

FIG. 5 of the drawings provides a top plan view of an alternative embodiment of the system in which the output gases are cooled, rather than being filtered. This system is particularly suitable for installation with industrial plants having cooling towers that otherwise release large quantities of steam into the atmosphere. While the steam may generally be relatively pure in its composition, the water vapor contained in the steam may be useful if condensed back to its liquid state, particularly in arid areas of the world.

Accordingly, the embodiment of FIG. 5 replaces the filter subsystem illustrated in FIGS. 1 and 2 with a gas cooling subsystem. The industrial output gases are delivered to the cooling subsystem by the gas input flue 12, also shown in FIGS. 1 and 2. The flue 12 is connected to the inlet end of a gas cooling duct 68 installed in a cooling basin or tank 70. A canopy 72 (shown in broken lines in FIG. 5) may be provided to reduce solar heating of the duct 68 and water in the cooling basin 70. The cooling duct 68 has an output end 74 that connects to the outlet flue 40. A liquid recirculation line 76 may be provided to extend from the outlet end 74 of the gas cooling duct 68 back to the gas input flue 12 or to some other point for collection.

The cooled gas then flows from the output end 74 of the cooling duct 68, through the divider pipes 42a, 42b, the two flapper valve assemblies 44a, 44b, the fan housing inlet pipes or manifolds 46a, 46b, and the fan housings 48a, 48b, where the cooled gases are drawn through the system by either of the fans 50a or 50b (shown in FIG. 3). The cooled gases then flow through the corresponding fan outlet pipe or manifold 54a or 54b to the corresponding connector pipe 56a or 56b to the collector pipe 58, generally as shown in FIG. 3 of the drawings. The cooled gas then flows to the classification plant subsystem 60 for further processing, if necessary. In the event of pure steam (or other pure gas) being released to pass through the system, the classification plant 60 is not required.

The present system for decontaminating industrial output gases in any of its various embodiments also includes an operating or control system for the overall plant or system. This is illustrated in FIG. 1 of the drawings, which shows a control room or facility 78 communicating with the various subsystems of the overall system. A filter control system cable 80a extends from the control center 78 to the filter housing and subsystem 18, and a fan control system cable 80b extends from the control center or facility 78 to the fans 50a and 50b in their housings 48a and 48b. A third control cable 80c extends from the control room or facility 78 to the gas classification plant 60. The control system provides completely automated or manual control over all of the various subsystems of the complete system 10.

It is to be understood that the present invention is not limited to the embodiments described above, but encompasses any and all embodiments within the scope of the following claims.

I claim:

1. A system for decontaminating industrial output gases, comprising:

a gas input flue;

a filter housing having an input end, an output end opposite the input end, and a length therebetween, the gas input flue communicating with the input end of the filter housing;

a first plurality of planar filters and a second plurality of planar filters, the filters being disposed transverse to the length of the filter housing and located between the input and output ends thereof, the first plurality of filters and the second plurality of filters being alternately positioned at active positions within the filter housing and inactive positions external to the filter housing so that the second plurality of filters is positioned external to the filter housing when the first plurality of filters is positioned within the filter housing, and the second plurality of filters is positioned within the filter housing when the first plurality of filters is positioned external to the filter housing, wherein the plurality of alternating first and second planar filters are successively paired in progressively decreasing filtration coarseness and wherein in the filter housing, a first filter of the first plurality of filters is separated from a second filter of the first plurality of filters by a section for accommodating a first filter of the second plurality of filters;

a plurality of filter wash nozzles disposed externally to the filter housing, the filter wash nozzles being adapted to selectively wash the plurality of filters disposed external to the filter housing; and at least one fan communicating with the output end of the filter housing, the fan drawing gases from the gas input flue and through the filter housing and filters positioned within the filter housing.

2. The system for decontaminating industrial output gases according to claim 1 wherein the at least one fan comprises a first fan and a second fan, the first fan and the second fan operatively alternating with one another.

3. The system for decontaminating industrial output gases according to claim 2, further comprising an automatically activated gas flow control valve disposed between each said fan and the output end of the filter housing.

4. The system for decontaminating industrial output gases according to claim 1, further comprising a catch basin adapted to capture water runoff from the filter wash nozzles and filters.

5. The system for decontaminating industrial output gases according to claim 1, further comprising a rotary brush disposed at each of the filter wash nozzles, each of the rotary brushes bearing against one of the filters disposed external to the filter housing.

6. The system for decontaminating industrial output gases according to claim 1, further comprising a gas separator plant communicating with the at least one fan.

7. The system for decontaminating industrial output gases according to claim 1, further comprising a gas burnoff and recirculation system communicating with the at least one fan.

8. The system for decontaminating industrial output gases according to claim 1, wherein the coarsest first pair of alternating filters are located adjacent the input end of the filter housing.

* * * * *